Figure 2:
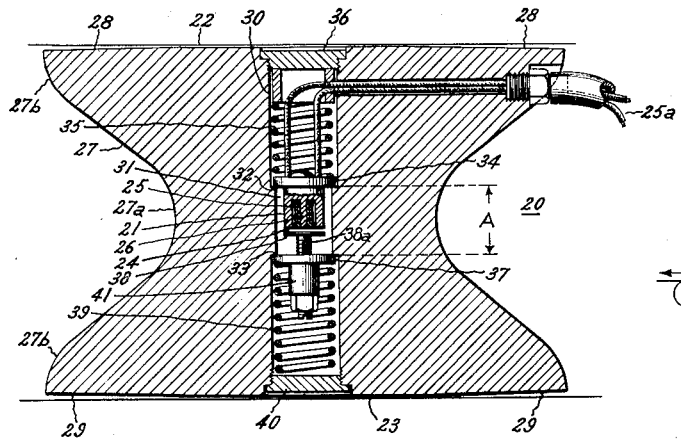

March 17, 1942.  C. M. HATHAWAY  2,276,843

PRESSURE MEASURING APPARATUS

Filed March 31, 1939

Inventor:
Claude M. Hathaway,
by Harry E. Dunham
His Attorney.

Patented Mar. 17, 1942

2,276,843

UNITED STATES PATENT OFFICE 2,276,843

PRESSURE MEASURING APPARATUS

Claude M. Hathaway, Denver, Colo., assignor to General Electric Company, a corporation of New York Application March 31, 1939, Serial No. 265,258

3 Claims. (Cl. 265—1)

This invention relates to the measurement of pressures and more particularly to improved apparatus for use with electric gage means for measuring heavy pressures or compressive loads.

An object of my invention is to provide improved apparatus for accurately determining heavy pressures and particularly the rolling pressures encountered in the operation of rolling mills employed for rolling metal, rubber and the like.

Another object of my invention is to provide an improved pressure-responsive device which is highly compact and which is adapted to be readily moved to any location for directly measuring the pressure or compressive force between any two opposing surfaces.

A further object of my invention is to provide an improved pressure-responsive means for supporting the electric gage element in which hysteresis effects are avoided.

Other and further objects and advantages of my invention will become apparent as the description proceeds.

It is highly important in the operation of a rolling mill, for example, to have available apparatus for providing an accurate measurement of the rolling pressures in order to reduce to a minimum the likelihood of failure of certain portions of the apparatus of the mill due to unintentional overloading. Other considerations, such as the operation of the mill at the point of maximum efficiency, "levelling up" the mill after a shutdown, proper load distribution to the several stands in the case of a tandem mill, detection of uniformity or lack of uniformity in the material as it enters the mill, and the production of a uniform finished product, provide additional reasons for an accurate knowledge of the load exerted on the equipment in the rolling mill.

In carrying out my invention in its preferred form, I employ an elastic pressure-responsive member of generally axially symmetrical form having end portions or surfaces against which the pressure or compressive load to be measured is applied and having its external longitudinal surfaces curved or bowed inwardly toward the axis of compression. By curving the external longitudinal surface inwardly from each end toward its middle section, the pressure-responsive member is made of smaller diameter at its intermediate portion than at its ends. The elastic member is provided with a central axial longitudinal bore or opening which is in the direction of the axis of compression. As pressure is applied to its end surfaces, the elastic body undergoes a proportional change in length and to detect this change in length, I mount a magnetic gage element in the central bore or opening, the magnetic circuit of which gage element includes an air gap the length of which is adapted to vary directly with the change in length of a given longitudinal section of the reduced cross-section portion of the elastic member. I take advantage of the fact that variations in the air gap of a magnetic circuit cause a change in the reluctance of said circuit and by changing this air gap in response to and in proportion to the pressures or compressive loads under measurement, I am able to influence suitable instruments to indicate or record the said pressures.

Figure 1:
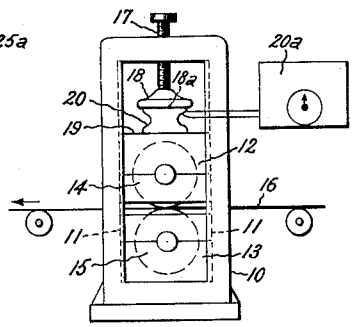
Figure 3:
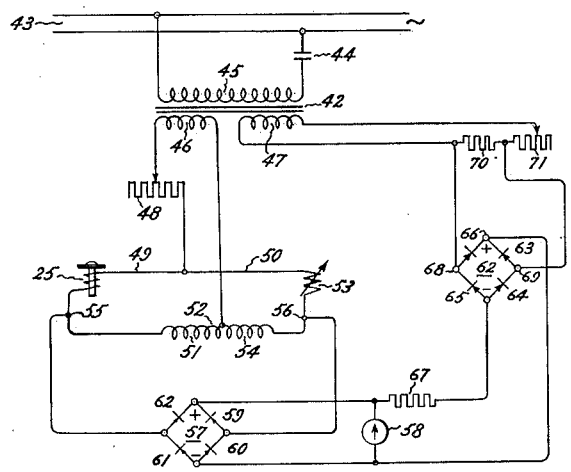

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which Fig. 1 is an assembly view in elevation of one type of apparatus which may be used with my invention; Fig. 2 is a side elevation in section of apparatus embodying my invention; and Fig. 3 is a diagram of connections which shows the manner of connecting a portion of the apparatus of Fig. 2 in an electrical circuit for carrying out my invention.

Referring to Fig. 1, I have shown an end view of apparatus which may be employed for rolling metal, together with means including my invention for determining the amount of pressure applied to the rolls of the apparatus. The numeral 10 designates a framework arrangement positioned at one end of the rolls and provided with a groove or guideway 11 at each side for supporting the movable bearings 12 and 13 of the work rolls 14 and 15, respectively. The metal or material being rolled is represented by the numeral 16 and is shown undergoing a reduction in thickness as it passes through the rolls 14 and 15 in the direction indicated. I provide a screw down arrangement 17 which may be either manually or power operated for applying the desired pressure to one end of the work rolls 14 and 15. A corresponding unit may be placed at the other end of the rolls. The screw down is provided with a capped portion 18 having a load or pressure application surface 18a. In order to determine the amount of pressure applied by the screw down 17, I insert the improved apparatus of my invention, which is designated by the numeral 20 and shown in its preferred form as being of generally spool-shape construction, between the pressure application surface 18a of the capped portion 18 of the screw down and the upper or pressure application surface 19 of the bearing member 12. As pressure is applied to the material 16 passing between the rolls 14 and 15, the reduced cross-section portion of member 20 undergoes a reduction in its length and I utilize this dimensional change for producing a corresponding variation in an electrical circuit whereby the amount of pressure applied to the rolls may be read on an indicating or recording device 20a.

For a better understanding of the operation of my invention reference may be had to Fig. 2 showing an enlarged sectional view of the member 20 together with the magnetic gage element 21 mounted in the operating position. The body or member 20 may conveniently be constructed of an elastic material such as steel, so that as pressure is applied to its end portions or surfaces 22 and 23 the length of the longitudinal section A of the portion of reduced cross-section of the body is altered in response to and in proportion to the applied pressure, thereby altering the air gap 24 of the magnetic gage element 21 to change the reluctance of its magnetic circuit and cause a change in the reactance of the coil 25 which is mounted on the central leg 26 of the magnetic core 21.

It should be understood that the pressures encountered in rolling mill operation at times reach tremendous proportions, they being oftentimes as high as several million pounds. Heretofore, various devices have been devised to provide means for obtaining a measurement of these pressures but for one reason or another such devices have not been entirely successful. For example, it has been proposed to employ a ring or cylinder for supporting the gage element, the pressure to be measured being applied to the end portions of the ring. The application of heavy loads to the end portions of such a device causes radial expansion to take place in the ring or cylinder. This radial expansion with increasing loads is restrained to a certain extent by friction between each face of the pressure-responsive cylinder and the face of its corresponding pressure application member, which corresponds to surfaces 22—18a, and surfaces 23—19, respectively, of my device. Similarly, in such an arrangement friction hinders contraction radially upon release of the load. The net result is a hysteresis effect in the calibration curve of the ring or cylinder to which the pressure is applied, which produces a greater gage output with decreasing loads than with increasing loads.

By the use of an elastic body such as member 20 of my invention the aforementioned difficulty may be overcome. The external diameter of the compression member 20 decreases in going from each end in the direction of its longitudinal center to form a portion of reduced cross-section or diameter as indicated at 27a, leaving a portion 27b of generally flangelike form of greater diameter adjacent each end. As a result the lateral surface 27 of the body 20 which joins the end surfaces 22 and 23 is concaved or curved inwardly toward the axis of compression. Therefore, I preferably form the body 20 in axial symmetry with an exterior surface of a shape which may conveniently be described as a surface of revolution formed by the revolution of a curved line about an axis lying on the convex side of the line.

The terminology "axial symmetry" is intended to designate a body of the form which if intersected by a plane perpendicular to its longitudinal axis will have all points on the periphery of the intersecting plane equidistant from this axis. The external lateral surface 27 may be of the character of one formed by the revolution about the axis of compression or longitudinal axis of the member 20 of a line whose displacement from the axis varies from point to point along the line, the point of least displacement between the line and axis being in the vicinity of the midpoint of the line as indicated at 27a. I have shown the surface 27 joining the surfaces 22 and 23 in an angular relation but it is obvious that I may make this portion of the device of curved or convex form if found desirable.

By forming the body 20 as described generally in the shape of a rope belt pulley the stresses due to the applied pressure are concentrated in the portion 27a where the area of cross-section is smallest, and the electric gage is mounted so that compression of only the reduced diameter portion having a variable axial length A is measured. The aforesaid hysteresis phenomena in the calibration curve due to end effects is minimized because the value of the compressive stress in the vicinity of the reduced cross-section waist portion 27a of the spool is affected very slightly by stresses along the contact surfaces 22 and 23 at the ends of the spool. The contact surfaces 22 and 23 may be made of convex form with a slight curvature as shown at 28 and 29, respectively, to further aid in reducing the effect of radial friction at these surfaces.

I have found it preferable to shape the pressure-responsive member 20 in approximately the proportions shown in Fig. 2 and, as an example for a particular application, I may make the diameter at each end 12 inches, the diameter at the smallest or middle portion 27a, 6 inches, and the length 8 inches.

The opening or bore 30 in the compression member 20 is provided with a section 31 of reduced diameter to provide shoulder portions 32 and 33 for supporting the gage element and has a longitudinal dimension A' which varies with the load applied to the contact surfaces 22 and 23. A ring or flanged portion 34 of the magnetic element 21 is adapted to rest against the shoulder 32 and is held in constant engagement therewith by means of a helical spring 35 to which pressure is applied by means of a screw member 36 which engages threads in the upper end of the bore 30. Similarly, the ring or flanged member 37 which serves to position the armature 38 of the gage is held in constant engagement with the shoulder 33 by means of a helical spring 39 to which pressure is applied by means of a second screw member 40 which engages threads in the other end of the bore 30. In order to provide means for moving the armature 38 to adjust the air gap 24 to the desired position for the zero reference point, I mount the armature 38 on a boltlike member 38a which is provided with threads and which is adapted to engage corresponding threads in a sleeve member 41, which if desired may be made integral with the flange 37.

The operation of my device will be better understood by considering it in connection with the other elements of the system in which it is employed. In a copending application Serial No. 198,337, filed March 26, 1938, and assigned to the same assignee as the present invention, is a diagram of electrical connections to which my device is adapted. This diagram of connections is shown in Fig. 3 of the drawing but it forms no part of the present invention.

In the arrangement represented by Fig. 3, a source of regulated voltage is provided such as a voltage regulating transformer 42 energized by a source of alternating current 43 and consisting essentially of a capacitor 44 and a winding 45 in series, the winding 45 having a saturable core which is operated above the point of saturation. Thus if variations in the voltage of the source 43 take place, while the current flowing through the winding 45 and the capacitor 44 in series will vary, the flux in the core and the voltage induced in the secondary windings 46 and 47 will remain substantially constant. The regulated or substantially constant voltage provided by the secondary winding 46 is connected in circuit with a sensitivity control rheostat 48 to energize two differentially connected electric circuits 49 and 50. Connected in the circuit 49 is the coil 25 of my device shown in Fig. 2, the reactance of which is altered in response to variations in the compressive load applied to the member 20, and in series with it is a winding portion 51 of a reactor 52. Connected in the circuit 50 are elements similar to those in the circuit 49, namely a balancing coil 53 which is similar to coil 25 mentioned above, and a second winding 54 of the reactor 52. The winding portions 51 and 54 are preferably made electrically similar so that with equal currents flowing in the differential circuits, the voltage between the neutral points 55 and 56 will be zero. The balancing coil 53 provides means for adjusting the condition of balance or unbalance of the bridge for any given setting of the air gap 24.

The diagonal of the Wheatstone bridge circuit as represented by the neutral terminals 55 and 56 is connected to an alternating current-responsive device such as a rectifier voltmeter 57 consisting of a direct current-responsive zero center type instrument 58 and four rectifiers such as copper oxide rectifiers 59, 60, 61, and 62, for example, arranged to provide full-wave rectification.

Due to the wide variation in the resistance-current characteristic of rectifiers of the dry type, particularly for low current values, such devices operate more nearly perfectly as rectifiers when they are carrying a given amount of current. Accordingly, I prefer to operate the Wheatstone bridge in the unbalanced condition for the condition of zero load on the member 20. With such an arrangement I could, if desired, replace the zero center type instrument 58 with a suppressed zero instrument, that is, an instrument which reads zero when it is actually carrying a current, and if such an instrument is utilized, it will be understood, of course, that the balancing coil 53 and the air gap 24 will be so adjusted that the bridge is unbalanced when the instrument reads zero. However, with such an indicating circuit any alteration in the setting of the sensitivity control rheostat 48 will vary the unbalance and upset the zero adjustment.

In order to make the sensitivity of the apparatus independent of the zero adjustment, I prefer to employ a zero center type instrument 58 and connect it so that it receives current not only from the rectifier 57, but also from a second rectifier 62 energized by the other secondary winding 47 of the transformer 42. The rectifier 62 is similar in type to the rectifier 57, consisting of four copper oxide rectifiers 63, 64, 65, and 66. The rectifier bridges 57 and 62, however, are connected so as to have opposite polarities with respect to the instrument 58 and, consequently, no current flows in instrument 58 and it stands at zero when the outputs of the rectifiers 57 and 62 are equal. I may connect a resistance 67 in the output circuit of rectifier bridge 62 to compensate for any inequality in the resistance-current characteristics of the rectifiers 57 and 62. This resistance serves to prevent the rectifier 62 from unduly shunting the instrument 58 and thereby lowering its sensitivity. I connect the secondary winding 47 of the transformer 42 in series with resistance elements 70 and 71 and energize the rectifier 62 by connecting its alternating current terminals 68 and 69 to the voltage provided across resistance element 70. By means of the variable resistance element 48 sensitivity control may be obtained and by means of the variable resistance element 71 zero adjustment of the instrument 58 is made available.

There are obviously numerous ways in which the apparatus of my invention may be operated. For example, it may be desirable to have the instrument 58 calibrated directly in actual pounds pressure, or in certain operations it may be sufficient to know merely the deviation from a standard or known pressure. Assume for purposes of illustration that it is desired to indicate the amount by which an applied pressure deviates from a known or standard pressure. For purposes of calibration I may place the pressure-responsive or generally spool-shaped member 20 in a testing machine of any desired type and apply a known pressure to the surfaces 22 and 23. The resistance element 71 is then adjusted to bring the instrument 58 to a zero indication. The pressure may then be reduced or increased to a known deviation from the standard or reference value and by adjusting the resistance 48 the sensitivity of the instrument 58 may be set for the desired scale reading. The standard or reference pressure is then again applied and the final zero adjustment is made by means of the rheostat 71. The sensitivity of the apparatus being independent of the zero adjustment, it will be unnecessary to readjust the rheostat 48. As explained above, if desired, the circuit may also be adjusted with the bridge unbalanced so that the indicating instrument 58 reads zero with zero pressure applied to the member 20. The instrument may then be calibrated as already explained.

To obtain a still better understanding of the operation of my device, assume that it is desired to measure the pressure on the rolls of the rolling mill of Fig. 1. The member 20, with the air gap 24 adjusted to the desired value, is placed in position between the surface 18a of the capped portion 18 of the screw down 17 and the surface 19 of the bearing member 12, and the zero setting of the measuring instrument is adjusted as already described. The strip 16 is moved between the rolls 14 and 15 and as pressure is applied to the rolls by means of the screw down member 17, compression takes place in the member 20 causing a reduction in the longitudinal dimension A, which in turn produces a corresponding reduction in the air gap 24 in the magnetic circuit and causes a further unbalance of the gage circuit. The instrument 58 thereby gives an indication of the amount of pressure applied to the surfaces 22 and 23.

Elsewhere in this specification, in describing my invention, I have referred to the external surface of the body 20 as being in the form of a surface of revolution formed by the revolution of a curved line about an axis on the convex side of the line. While this is believed to be the best known form in which the advantages of my invention may be most effectively realized, my invention is not limited to such a construction but also includes those arrangements in which the outer surface is not curved. For example, it may be formed by using a combination of straight lines. It should also be understood that the portion of least diameter or cross-section need not be located at the middle of the elastic member 20. This portion may also be arranged so that it is much closer to one end than to the other; the principal requirement in this regard being that the gage coil be located so that it is responsive to changes in the longitudinal dimension of the portion where the cross-section is the least.

I have thus provided a reliable device which may be employed for accurately measuring pressures or compressive loads over a wide range, including the extremely high pressures often encountered in rolling mill operations. Inasmuch as the elastic member 20 accommodates the magnetic element of the gage, the apparatus of my invention forms a compact arrangement which may be moved to any desired location for measuring pressures between any two surfaces.

While I have shown and described a device adapted to the measurement of pressures applied to the rolls of a rolling mill for rolling strip material, such as metal, it is obvious that my invention is not limited to such use, but may be applied in any case wherein pressure is applied between opposed surfaces. Its use with rolling mills merely forms one of its most useful fields of application. Other well-known means may be employed for measuring the unbalance of the bridge due to changes in pressure and, if desired, a recording device may be substituted for the indicating instrument 58 to produce a record of the deflections of the bridge over a period of time. The bridge circuit may even be dispensed with in certain cases merely by connecting the leads 25a of coil 25 in circuit with an alternating current source of constant voltage and a suitable indicating instrument. Variations in the air gap 26 will alter the reactance of the coil 25 to cause corresponding variations in the current flowing in the circuit. Or, if desired, I may place a second coil in the magnetic circuit of winding 25 and connect winding 25 to a source of alternating current and the other winding to an indicating or recording device. Variations of the air gap 26 will alter the inductive coupling between the two windings to cause a proportional response in the measuring circuit. It is obvious that various other arrangements may be employed, examples of which will readily occur to those skilled in the art. It is therefore intended that all matters contained in the foregoing description or shown in the accompanying drawing shall be interpreted as illustrative and not in a limited sense.

What I claim as new and desire to secure by Letters Patent of the United States is:

1. A pressure responsive device comprising a solid body of elastic material of axially symmetrical form having convex surfaces on the end portions thereof against which the pressure to be measured may be applied, and having an exterior lateral surface between said convex surfaces, said surface being substantially in the shape of a surface of revolution formed by the revolution of a curved line about an axis on the convex side of the curved line, and the curvature of said line being such as to form a curved section of reduced diameter intermediate said end portions, the relation between the diameter of said intermediate section for a given length along the axis of revolution and the end portion diameter of said body being such that when pressure is applied to said end surfaces compressive forces proportional thereto are concentrated in said reduced diameter section to cause a proportional longitudinal compression thereof along said axis of revolution.

2. A device for measuring compressive loads comprising a solid body of elastic material of axially symmetrical form having convex surfaces on the ends thereof against which the pressure to be measured may be applied and having an exterior lateral surface between said convex surfaces, said lateral surface being formed by the revolution about a given axis of a line whose displacement from the axis varies from point to point along the line, the point of least displacement of said line and axis being in the vicinity of the mid-point of the line, the length of said body and the diameter of said ends being so proportioned with respect to the diameter of said body at said point of least displacement that forces proportional to the pressures applied to said convex surfaces are concentrated in the section of least displacement to cause longitudinal compression thereof, and means for measuring changes in length only of the portion of the body adjacent and including the section of minimum diameter.

3. In a device for measuring compressive loads, a solid body of elastic material having surfaces against which the pressure to be measured may be applied and having an exterior lateral surface between said surfaces, said lateral surface being curved inwardly in the direction of the axis of compression, a central opening in said body having its axis in alignment with the axis of compression, and means for supporting a gage element in said opening adapted to respond to variations in a longitudinal dimension of said body along the axis of compression.

CLAUDE M. HATHAWAY.